(12) United States Patent
Shen

(10) Patent No.: US 6,547,130 B1
(45) Date of Patent: Apr. 15, 2003

(54) INTEGRATED CIRCUIT CARD WITH FINGERPRINT VERIFICATION CAPABILITY

(76) Inventor: Ming-Shiang Shen, No. 15, Hsin-Lun Rd., Tou-Nan Chen, Yunlin Hsien (TW)

(*) Notice: Subject to any disclaimer, the term of this patent is extended or adjusted under 35 U.S.C. 154(b) by 0 days.

(21) Appl. No.: 09/366,976

(22) Filed: Aug. 4, 1999

(30) Foreign Application Priority Data

Jun. 3, 1999 (TW) ........................................ 88209054 U

(51) Int. Cl.$^7$ ................................................ G06K 5/00
(52) U.S. Cl. ........................... 235/380; 235/492; 902/3; 382/115
(58) Field of Search .................. 235/379, 380, 235/381, 382, 487, 492; 902/2, 3, 26; 705/26, 51, 54, 58; 382/115, 116, 124, 125, 127, 224; 713/186, 176, 200, 201, 185

(56) References Cited

U.S. PATENT DOCUMENTS

| | | | |
|---|---|---|---|
| 4,582,985 A | * 4/1986 | Lofberg | 235/380 |
| 4,630,201 A | * 12/1986 | White | 361/408 |
| 4,766,293 A | * 8/1988 | Boston | 235/379 |
| 4,926,480 A | * 5/1990 | Chaum | 380/23 |
| 5,020,105 A | * 5/1991 | Rosen et al. | 380/23 |
| 5,180,901 A | * 1/1993 | Hiramatsu | 235/380 |
| 5,280,527 A | * 1/1994 | Gullman et al. | 380/23 |
| 5,623,552 A | * 4/1997 | Lane | 382/124 |
| 5,959,541 A | * 9/1999 | DiMaria et al. | |
| 6,012,636 A | * 1/2000 | Smith | 235/380 |
| 6,069,970 A | * 5/2000 | Salatino et al. | 382/124 |

FOREIGN PATENT DOCUMENTS

| | | | |
|---|---|---|---|
| JP | 63-163589 A | * | 7/1988 |
| JP | 02-118790 A | * | 5/1990 |
| JP | 11-039483 | | 2/1999 |

* cited by examiner

*Primary Examiner*—Diane I. Lee
(74) *Attorney, Agent, or Firm*—Cook, Alex, McFarron, Manzo, Cummings & Mehler, Ltd.

(57) ABSTRACT

An integrated circuit card is accessed by a card reader that is capable of establishing a communications link with a host computer. The integrated circuit card includes a card body, a memory device mounted on the card body, a fingerprint sensor mounted on the card body, a card reader interface circuit mounted on the card body, and a processing unit mounted on the card body and connected to the memory device, the fingerprint sensor and the card reader interface circuit. The memory device stores fingerprint reference data obtained by scanning a fingerprint of an assigned user, and card information therein. The fingerprint sensor scans a fingerprint of a holder of the card body, and generates fingerprint scan data. The card reader interface circuit is activable so as to communicate with the card reader. The processing unit receives the fingerprint scan data from the fingerprint sensor, and compares the fingerprint scan data with the fingerprint reference data in the memory device to verify if the holder of the card body is the assigned user. The processing unit activates the card reader interface circuit for exchanging the card information with the host computer via the card reader upon verifying that the holder of the card body is the assigned user.

14 Claims, 5 Drawing Sheets

INTEGRATED CIRCUIT CARD WITH FINGERPRINT VERIFICATION CAPABILITY

BACKGROUND OF THE INVENTION

1. Field of the Invention

The invention relates to an integrated circuit card, more particularly to an integrated circuit card with fingerprint verification capability.

2. Description of the Related Art

At present, people have no need to prepare a lot of cash when making purchases, but instead use plastic currencies, such as a credit card, a bank card and so on. Because of the convenience of plastic currencies, it is not uncommon for one to have at least one plastic currency and other cards, such as an identification card and a pass card. When the cards are misplaced or stolen, the owner of the cards must take the risk of misappropriation of the cards.

SUMMARY OF THE INVENTION

Therefore, the object of the present invention is to provide an integrated circuit card with fingerprint verification capability which can reduce the risks involved when the card is stolen or misplaced, and which enhances convenience and security when making network transactions.

According to the present invention, an integrated circuit card is accessed by a card reader that is capable of establishing a communications link with a host computer. The integrated circuit card comprises a card body, a memory device mounted on the card body, a fingerprint sensor mounted on the card body, a card reader interface circuit mounted on the card body, and a processing unit mounted on the card body and connected to the memory device, the fingerprint sensor and the card reader interface circuit. The memory device stores fingerprint reference data obtained by scanning a fingerprint of an assigned user, and card information therein. The fingerprint sensor scans a fingerprint of a holder of the card body, and generates fingerprint scan data. The card reader interface circuit is activable so as to communicate with the card reader. The processing unit receives the fingerprint scan data from the fingerprint sensor, and compares the fingerprint scan data with the fingerprint reference data in the memory device to verify if the holder of the card body is the assigned user. The processing unit activates the card reader interface circuit for exchanging the card information with the host computer via the card reader upon verifying that the holder of the card body is the assigned user.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
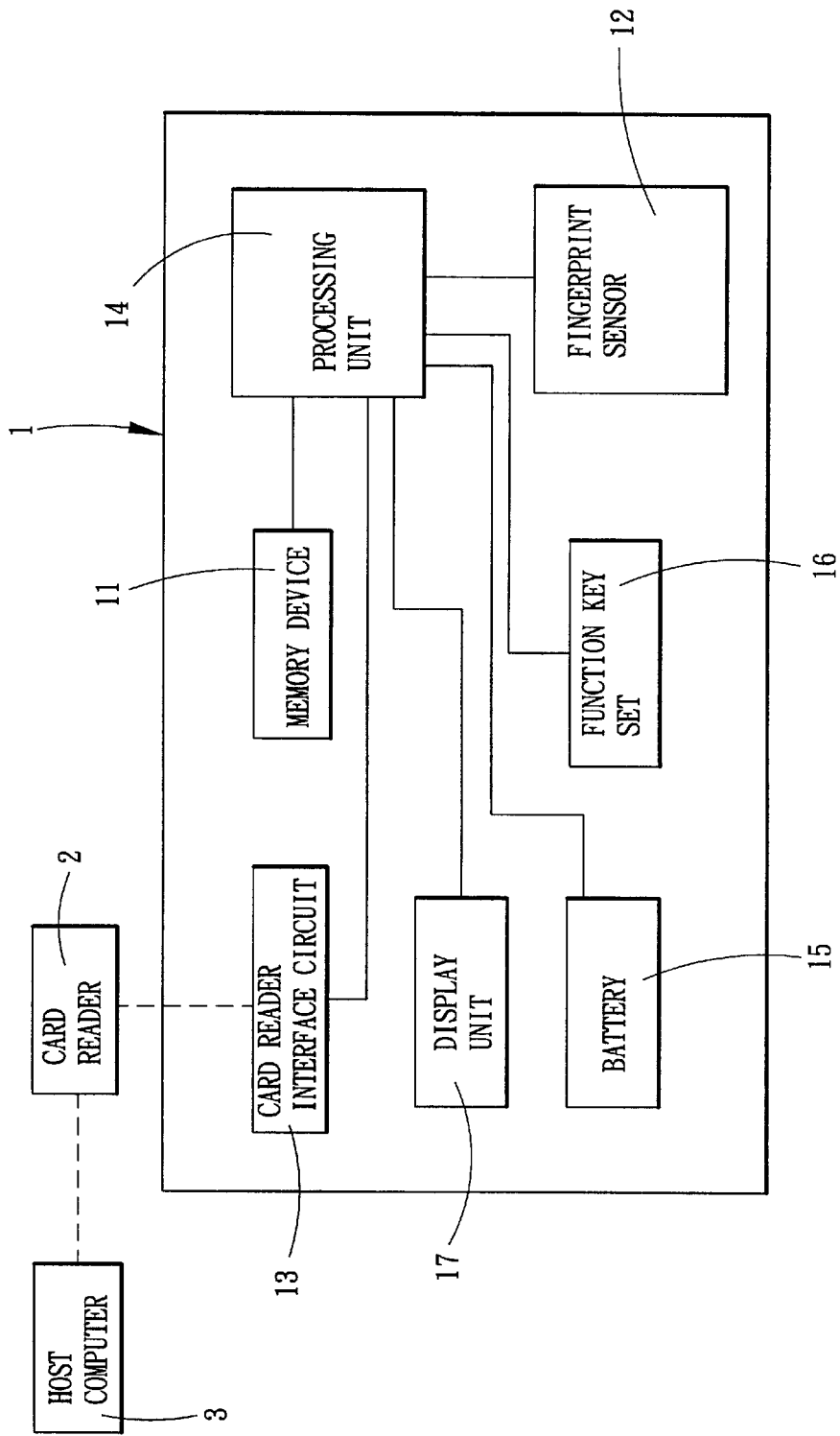
FIG. 1 is a schematic electrical circuit block diagram illustrating the preferred embodiment of an integrated circuit card according to this invention.

Referring to FIG. 1, according to the preferred embodiment of this invention, an integrated circuit card 1 is shown to be accessed by a card reader 2 that is capable of establishing a communications link with a host computer 3. The card reader 2 is usually disposed at a public place, such as a shop or a department store, and the host computer 3 is installed at a bank, credit card center and so on. The integrated circuit card 1 includes a card body 18, a memory device 11 mounted on the card body 18, a fingerprint sensor 12 mounted on the card body 18, a card reader interface circuit 13 mounted on the card body 18, a processing unit 14 mounted on the card body 18, a battery 15 mounted on the card body 18, a function key set 16 mounted on the card body 18, and a display unit 17 mounted on the card body 18.

In the present embodiment, the memory device 11 is a flash memory. The memory device 11 stores fingerprint reference data obtained by scanning a fingerprint of an assigned user, and card information, such as a credit card number, a bank account number and an assigned user identification card number, therein. The fingerprint reference data includes a plurality of scan line data, each of which describes fingerprint characteristics in a respective scanning line of the fingerprint of the assigned user.

Figure 2:
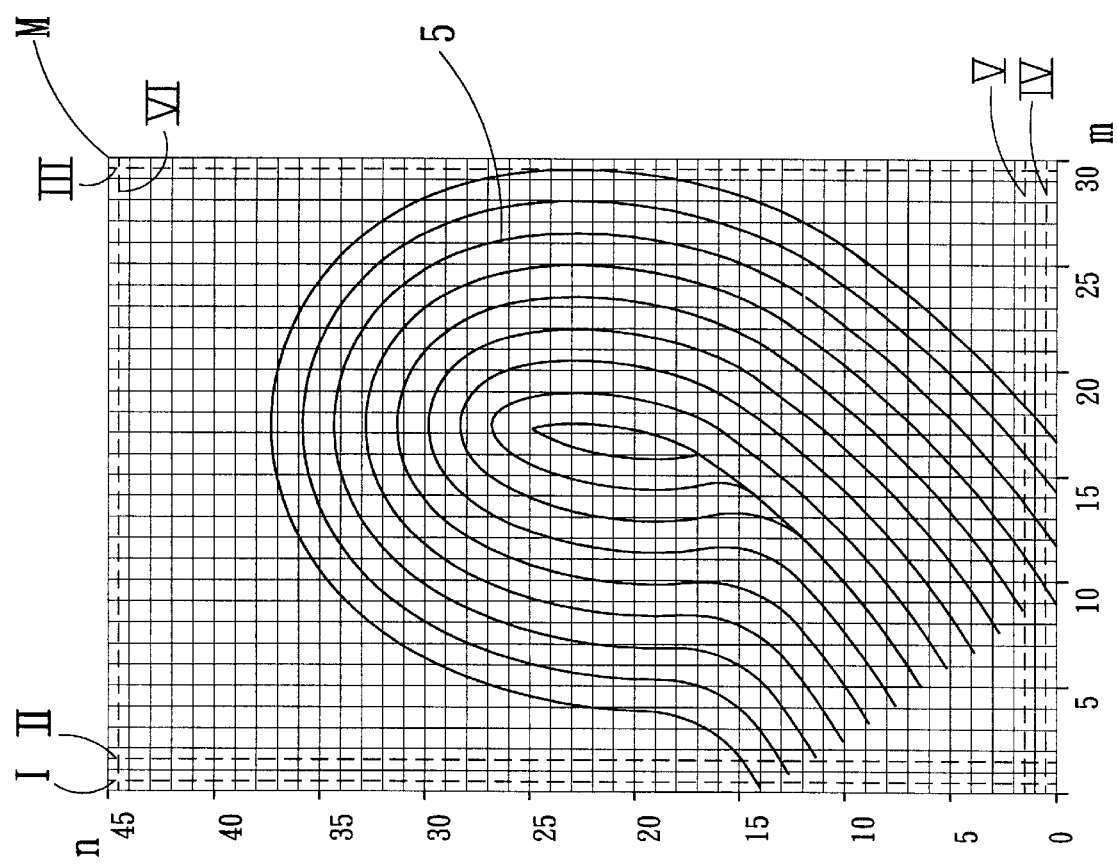
FIG. 2 is a schematic view of a fingerprint scanning area of a fingerprint sensor.
Figure 3:
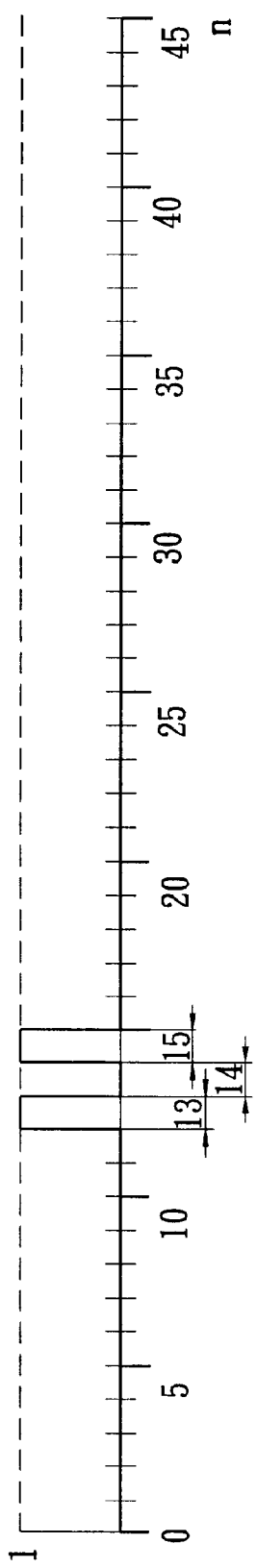
FIG. 3 is a scan line data diagram illustrating a first scanning line (I) in a column direction of FIG. 2.
Figure 4:
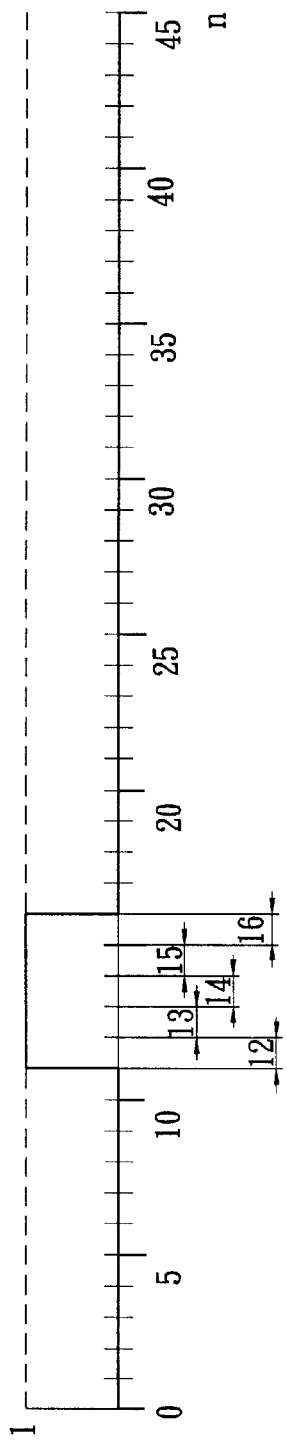
FIG. 4 is a scan line data diagram illustrating a second scanning line (II) in the column direction of FIG. 2.
Figure 5:
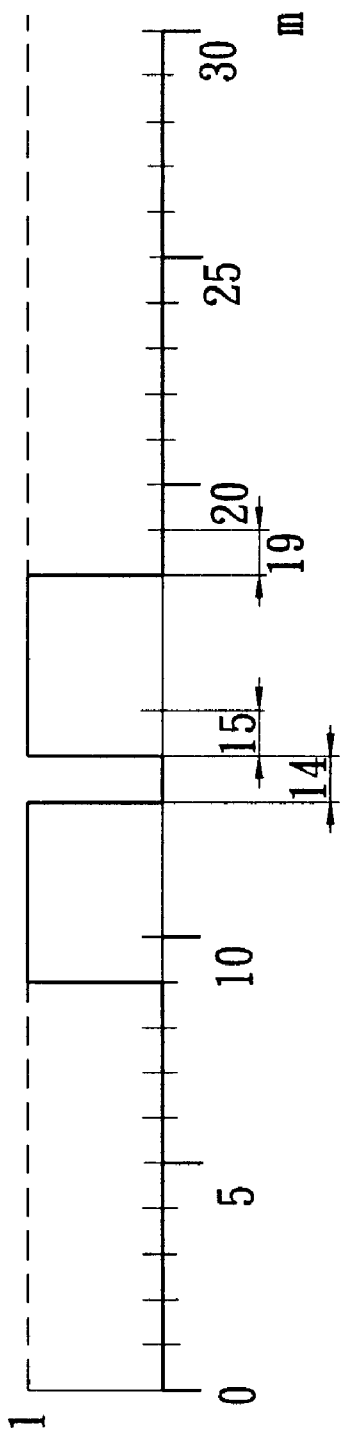
FIG. 5 is a scan line data diagram illustrating a first scanning line (IV) in a row direction of FIG. 2.

The fingerprint sensor 12 is adapted to scan a fingerprint 5 of a holder of the card body 18 and to generate fingerprint scan data. Referring to FIG. 2, the fingerprint sensor 12 includes an m×n array of scan cells that defines a fingerprint scanning area (M) The fingerprint scan data includes a plurality of scan line data obtained by scanning corresponding lines of the array of scan cells. The lines of the array of scan cells can be scanned in a column direction or a row direction of the array. For example, if m=30, n=45, a first scanning line (I) in the column direction is (1'n; n=1~45), a second scanning line (II) in the column direction is (2'n; n=1~45), and a thirtieth scanning line (III), the last scanning line in the column direction, is (30'n; n=1~45). A first scanning line (IV) in the row direction is (m'1; m=1~30), a second scanning line (V) in the row direction is (m'2; m=1~30), and a forty-fifth scanning line, the last scanning line in the row direction, is (m'45; m=1~30). Each of the scan cells generates a high logic signal upon detection of a ridge in the fingerprint 5 of the holder of the card body 18, and a low logic signal upon detection of a valley in the fingerprint 5 of the holder of the card body 18. In FIG. 3, the scan cells (1'13), (1'15) generate a high logic signal, respectively, and the other scan cells generate a lower logic signal when the fingerprint sensor 12 scans the first scanning line (I) in the column direction. FIG. 4 illustrates the scan line data obtained by scanning the second scanning line (II) in the column direction. FIG. 5 illustrates the scan line data obtained by scanning the first scanning line (IV) in the row direction. In view of the unique features of fingerprints, if the card holder is different from the assigned user, the fingerprint scan data will differ from the fingerprint reference data.

The card reader interface circuit 13 is activable so as to communicate with the card reader 2.

The processing unit 14 is connected to the memory device 11, the fingerprint sensor 12 and the card reader interface circuit 13. The processing unit 14 receives the fingerprint scan data from the fingerprint sensor 12, and compares the fingerprint scan data with the fingerprint reference data in the memory device 11 to verify if the holder of the card body 18 is the assigned user. The processing unit 14 activates the card reader interface circuit 13 for exchanging the card information with the host computer 3 via the card reader 2 upon verifying that the holder of the card body 18 is the assigned user. Thus, the integrated circuit card cannot be used if the card holder is not the assigned user.

The battery 15 is connected to the processing unit 14 and provides electrical power required by the integrated circuit card 1.

The function key set 16 is connected to the processing unit 14, and is operable so as to select the card information that is exchanged with the host computer 3. For example, when the function key set 16 is selected in a credit card mode, the card information exchanged with the host computer 3 includes the credit card number. Preferably, a segment of the fingerprint reference data stored in the memory device 11 is transmitted by the processing unit 14 to the host monitor 3 upon verifying that the holder of the card body 18 is the assigned user for increased security of network transaction. The segment of the fingerprint reference data includes chosen ones of the scan line data selected according to date or time of the exchange of the card information with the host computer 3. Alternatively, the chosen ones of the scan line data can be selected in a random manner.

In one example, each scan line data of the fingerprint reference data is numbered, such that the scan line data of an even scanning line in the column direction of the fingerprint scanning area (M) is designated by a number "0", the scan line data of an odd scanning line in the column direction of the fingerprint scanning area (M) is designated by a number "1", the scan line data of an even scanning line in the row direction of the fingerprint scanning area (M) is designated by a number "2", and the scan line data of an odd scanning line in the row direction of the fingerprint scanning area (M) is designated by a number "3". When the selected condition is a time of 2:30, a segment of the fingerprint reference data corresponding to the scan line data of the numbers 2, 3, 0 is accessed by the card reader 2 and is transmitted to the host computer 3 in the 0-2-3-0 sequence. The host computer 3 compares the segment of the fingerprint reference data with the fingerprint reference data stored in the host computer 3 at the selected time condition. In another example, when the selected condition is a time and a date of 4:33 May 3, 1999, a segment of the fingerprint reference data corresponding to the scan line data of the numbers 0,1, 3, 4, 9, 5 is accessed by the card reader 2 and is transmitted to the host computer 3 in the 1-9-9-9-0-5-0-3-0-4-3-3 sequence. Dynamic changing of the segment of the fingerprint reference data ensures that transaction conducted with the use of the integrated circuit card 1 is valid when a particular condition is met, e.g. 4:33 May 3, 1999. In other words, when unauthorized copying of the card information transmitted by the integrated circuit card 1 at a particular time and date occurred, use of the card information at another time and date will result in an invalid transaction that will be rejected by the host computer 3.

The display unit 17 is connected to and is controlled by the processing unit 14 for displaying the card information that is exchanged with the host computer 3 thereon. The display unit 17 can be further used to display information from the host computer 3, such as transacted amount, account balance, etc.

The integrated circuit card 1 of this invention has the following advantages:

1. Since the integrated circuit card 1 compares fingerprint scan data obtained by scanning a fingerprint of a holder of the card 1 with the fingerprint reference data in the memory device 11 to verify if the holder is the assigned user, the integrated circuit card 1 can only be used by the assigned user so as to reduce the risks involved when the integrated circuit card 1 is stolen or misplaced.

2. The card information exchanged with the host computer 3 can vary dynamically since the integrated circuit card 1 further transmits a segment of the fingerprint reference data that is selected according to time and date conditions, thereby further enhancing security when making network transactions.

3. Since the integrated circuit card 1 can be used as a bank card, an identification card or a credit card, the user only needs to bring along one card to accomplish different tasks, thereby resulting in added convenience.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. An integrated circuit card adapted to be accessed by a card reader that is capable of establishing a communications link with a hose computer, said integrated circuit card comprising:

a card body;

a memory device, mounted on said card body, for storing fingerprint reference data obtained by scanning a fingerprint of an assigned user, and for storing card information therein;

a fingerprint sensor mounted on said card body and adapted to scan a fingerprint of a holder of said card body and to generate fingerprint scan data;

a card reader interface circuit mounted on said card body and activable so as to communicate with the card reader; and a processing unit mounted on said card body and connected to said memory device, said fingerprint sensor and said card reader interface circuit, said processing unit receiving the fingerprint scan data from said fingerprint sensor and comparing the fingerprint scan data with the fingerprint reference data in said memory device to verify if the holder of said card body is the assigned user, said processing unit activating said card reader interface circuit for exchanging the card information with the host computer via the card reader upon verifying that the holder of said card body is the assigned user, wherein the fingerprint reference data includes a plurality of scan line data, each of which describes fingerprint characteristics in a respective scanning line of the fingerprint of the assigned user, said processing unit further transmitting a segment of the fingerprint reference data stored in said memory device to the host computer upon verifying that the holder of the card body is the assigned user, the transmitted segment of the fingerprint reference data including chosen ones of the scan line data being selected according to one of date and time of the exchange of the card information with the host computer, and wherein the transmitted segment of the fingerprint reference data is compared with fingerprint reference data stored in the host computer.

2. The integrated circuit card as claimed in claim 1, wherein said fingerprint sensor includes an m×n array of scan cells that defines a fingerprint scanning area.

3. The integrated circuit card as claimed in claim 2, wherein the fingerprint scan data includes a plurality of scan line data obtained by scanning corresponding lines of said array of scan cells.

4. The integrated circuit card as claimed in claim 3, wherein the lines of said array of scan cells are scanned in a row direction of said array.

5. The integrated circuit card as claimed in claim 3, wherein the lines of said array of scan cells are scanned in a column direction of said array.

6. The integrated circuit card as claimed in claim 2, wherein each of said scan cells generates a first logic signal upon detection of a ridge in the fingerprint of the holder of said card body, and a second logic signal upon detection of a valley in the fingerprint of the holder of said card body.

7. The integrated circuit card as claimed in claim 1, further comprising a function key set mounted on said card body and connected to said processing unit, said function key set being operable so as to select the card information that is exchanged with the host computer.

8. The integrated circuit card as claimed in claim 1, further comprising a display unit mounted on said card body and connected to and controlled by said processing unit for displaying the card information that is exchanged with the host computer thereon.

9. The integrated circuit card as claimed in claim 1, wherein the card information that is exchanged with the host computer includes a credit card number.

10. The integrated circuit card as claimed in claim 1, wherein the card information that is exchanged with the host computer includes a bank account number.

11. The integrated circuit card as claimed in claim 1, wherein the card information that is exchanged with the host computer includes an assigned user identification card number.

12. The integrated circuit card as claimed in claim 1, wherein said memory device is a flash memory.

13. The integrated circuit card as claimed in claim 1, wherein said scan line data of said fingerprint reference data is of a fingerprint scanning area having columns and rows from said scanned fingerprint of said assigned user, and wherein each said scan line data is numbered.

14. The integrated circuit card as claimed in claim 13 wherein each said numbered scan line data corresponds to a line selected from the group consisting of an even scanning line in the column direction of the fingerprint scanning area, an odd scanning line in the column direction, an even scanning line in the row direction, and an odd scanning line in the row direction.

* * * * *